(12) United States Patent
Filgas

(10) Patent No.: US 9,507,088 B2
(45) Date of Patent: Nov. 29, 2016

(54) ASYMMETRIC PWG WITH ASYMMETRIC COOLING

(71) Applicant: RAYTHEON COMPANY, Waltham, MA (US)

(72) Inventor: David M. Filgas, Newbury Park, CA (US)

(73) Assignee: Raytheon Company, Waltham, MA (US)

(*) Notice: Subject to any disclaimer, the term of this patent is extended or adjusted under 35 U.S.C. 154(b) by 0 days.

(21) Appl. No.: 14/749,398

(22) Filed: Jun. 24, 2015

(65) Prior Publication Data

US 2016/0047982 A1 Feb. 18, 2016

Related U.S. Application Data

(60) Provisional application No. 62/037,505, filed on Aug. 14, 2014.

(51) Int. Cl.
*G02B 6/42* (2006.01)
*G02B 6/122* (2006.01)
(Continued)

(52) U.S. Cl.
CPC ......... *G02B 6/1228* (2013.01); *G02B 6/12007* (2013.01); *G02B 6/4296* (2013.01); *G02B 6/4298* (2013.01); *H01S 3/0617* (2013.01); *H01S 3/0632* (2013.01); *H01S 3/0637* (2013.01); *G02B 2006/12159* (2013.01); *H01S 3/042* (2013.01); *H01S 3/0625* (2013.01);
(Continued)

(58) Field of Classification Search
CPC ........ G02B 6/42; G02B 6/12; G02B 6/1228; G02B 6/1207

USPC .......................................................... 385/30
See application file for complete search history.

(56) References Cited

U.S. PATENT DOCUMENTS

| 5,846,638 A | 12/1998 | Meissner |
| 6,418,156 B1 | 7/2002 | Peressini |

(Continued)

FOREIGN PATENT DOCUMENTS

EP 1 763 116 A1 3/2007

OTHER PUBLICATIONS

Jia, Yuechen, et al.; "Continuous wave ridge waveguide lasers in femtosecond laser micromachined ion irradiated Nd:YAG single crystals"; Optical Materials Express; vol. 2; No. 5; May 1, 2010; pp. 657-660.

(Continued)

*Primary Examiner* — Kaveh C Kianni
(74) *Attorney, Agent, or Firm* — Lewis Roca Rothgerber Christie LLP

(57) ABSTRACT

A planar waveguide (PWG) having a first end for coupling to a light pump and a second end opposite to the first end and including: a first cladding layer; a uniformly doped core layer having the first cladding layer on one side, wherein the core layer is tapered having a smaller thickness at the first end and a larger thickness at the second end; and a second cladding layer thinner than the first cladding layer, coated on another side of the core layer opposite to said one side of the core layer. The first cladding layer may also be tapered along the length of the PWG having a larger thickness at the first end and a smaller thickness at the second end with a taper angle substantially opposite that of the core layer to form the PWG with a substantially uniform overall thickness along the length.

14 Claims, 3 Drawing Sheets

(51) Int. Cl.
*G02B 6/12* (2006.01)
*H01S 3/063* (2006.01)
*H01S 3/06* (2006.01)
*H01S 3/08* (2006.01)
*H01S 3/0941* (2006.01)
*H01S 3/042* (2006.01)
*H01S 3/16* (2006.01)

(52) U.S. Cl.
CPC ........ *H01S3/08072* (2013.01); *H01S 3/09415* (2013.01); *H01S 3/1643* (2013.01)

(56) References Cited

U.S. PATENT DOCUMENTS

| | | | |
|---|---|---|---|
| 6,462,891 B1 | 10/2002 | Fukumoto et al. | |
| 6,934,313 B1* | 8/2005 | Deacon | 372/64 |
| 8,027,555 B1* | 9/2011 | Kliner et al. | 385/29 |
| 8,111,724 B2* | 2/2012 | Assefa et al. | 372/43.01 |
| 2004/0008405 A1* | 1/2004 | Pelouch et al. | 359/341.3 |
| 2005/0047739 A1 | 3/2005 | Parker et al. | |
| 2006/0263024 A1* | 11/2006 | Dong et al. | 385/125 |
| 2011/0200292 A1 | 8/2011 | Filgas | |
| 2014/0112616 A1 | 4/2014 | Numata | |
| 2014/0140659 A1* | 5/2014 | Demaray | 385/28 |
| 2014/0268309 A1 | 9/2014 | Strohkendl | |
| 2014/0307305 A1* | 10/2014 | Deri et al. | 359/342 |
| 2014/0309717 A1* | 10/2014 | Gustavsson | 607/90 |

OTHER PUBLICATIONS

Wolfe, Daniel B. et al.; "Fabrication of planar optical waveguides by electrical microcontact printing"; Applied Physics Letters; vol. 84; No. 10; Mar. 8, 2004; pp. 1623-1625.

Written Opinion of the International Searching Authority for International Application No. PCT/US2015/045143 filed Aug. 13, 2015, Written Opinion of the International Searching Authority mailed Nov. 2, 2015 (10 pgs.).

International Search Report for International Application No. PCT/US2015/045143, filed Aug. 13, 2015, International Search Report dated Oct. 23, 2015 and mailed Nov. 2, 2015 (4 pgs.).

* cited by examiner

ASYMMETRIC PWG WITH ASYMMETRIC COOLING

CROSS-REFERENCE TO RELATED APPLICATIONS

This Patent Application claims the benefits of U.S. Provisional Patent Application Ser. No. 62/037,505, filed on Aug. 14, 2014 and entitled "Asymmetric PWG With Asymmetric Cooling," the entire content of which is hereby expressly incorporated by reference.

FIELD OF THE INVENTION

The present invention relates generally to planar waveguides (PWGs); and more particularly to an asymmetric PWG with asymmetric cooling.

BACKGROUND

An optical waveguide guides electromagnetic waves in the optical spectrum. Optical waveguides may be used as the transmission medium in optical communication systems. A waveguide can also be used as an optical amplifier, e.g. an Erbium-doped fiber amplifier. A planar waveguide (PWG) is a particular type of waveguide that guides an optical wave in only one transverse axis. A PWG has a planar, 3-layer sandwich geometry consisting of a higher refractive index middle (core) layer that is surrounded on both sides by lower refractive index cladding layers. A PWG typically has a high aspect ratio (e.g., 100:1 or more), i.e. thin in one transverse axis and wide in the other, and also possessing large flat surface areas that facilitate mounting and heat removal in certain configurations, e.g. PWG amplifiers. Light may be confined in the middle layer by total internal reflection since its refractive index is higher than the surrounding cladding layers. Guided modes of a PWG are excited by injecting light into one end of the core layer.

PWGs are often used in lasers, such as laser diodes. They are also used in many optical components, such as Mach-Zehnder interferometers and wavelength division multiplexers. The cavities of laser diodes are frequently constructed as rectangular optical waveguides.

A PWG amplifier is an optical amplifier that uses a waveguide to confine the optical signal, such as a laser beam, in a one-dimensional propagating mode thereby maintaining a high intensity in a long amplification path. Amplification is typically obtained by stimulated emission of photons from dopant ions in a doped core of the PWG. Typically, the core has a constant doping level. A pump laser excites ions into a higher energy level from where they can transition via stimulated emission of a photon at the signal wavelength back to a lower energy level. The excited ions can also decay spontaneously (spontaneous emission) or even through non-radiative processes involving interactions with phonons within the medium. These last two types of decay mechanisms compete with stimulated emission reducing the efficiency of light amplification. A major barrier to a high power laser gain medium (amplifier) is the maximum temperature along the device, which could lead to destruction or malfunctioning of the device. The temperature profile is at its peak where the pump light is input into the PWG. A high temperature gradient in a transverse direction also leads to wavefront distortion within the PWG. Power scaling is ultimately limited by thermal effects that are proportional to the peak heat load per unit length.

The dopant concentration has a direct effect on the performance of the PWG amplifier. Relatively high doping concentrations allow the desired signal amplification to occur using a PWG that is short in the direction of propagation, however this leads to relatively higher heating of the PWG which can cause it to degrade or fracture under thermal stress. High doping concentrations also produce more gain in the lateral direction giving rise to amplified spontaneous emission and parasitic lasing which quench the population inversion in the laser amplifier, thereby reducing the desirable signal amplification. Relatively low doping concentrations require longer PWGs to provide the desired signal amplification and these are more difficult to manufacture and handle.

A wavefront is the locus of points having the same phase, i.e., a line or curve in two dimensions, or a surface for a wave propagating in three dimensions. Wavefront distortion in a high power PWG amplifier results from thermal gradients in the unguided transverse axis of the PWG. Minimizing these transverse gradients helps enable high beam quality operation at high output power. Conventional high power PWG lasers use symmetric structures with cooling methods applied to both sides of the PWG.

Planar waveguides have historically been fabricated with uniform core thickness and uniform cladding thickness. This leads to higher heating near the end(s) where pump power is coupled into an end-pumped PWG. Since the power scaling is fundamentally limited by thermal effects, devices with non-uniform heating cannot achieve the power scaling potential of devices with more uniform heating. Prior attempts to improve thermal uniformity have utilized doping gradients or segmented doping in the gain medium to improve thermal uniformity but methods of fabricating laser gain media with doping gradients are low in maturity and complex to implement.

SUMMARY

In some embodiments, the present invention is a PWG or a laser gain medium (amplifier) geometry that is optimized for scalability to high power levels with simplified manufacturing. The invention achieves a highly uniform pump distribution in the gain medium without requiring doping level gradients (of the conventional schemes), which is difficult to manufacture. The core of the laser gain medium has a tapered configuration along its length.

In some embodiments, the present invention is a planar wave guide (PWG) having a uniformly doped tapered core and a single un-doped cladding layer. In some embodiments, the present invention may include a much thinner second un-doped cladding layer, which may be only a coating over the core layer.

In some embodiments, the present invention is a PWG having a first end for coupling to a light pump and a second end opposite to the first end and including: a first cladding layer; a uniformly doped core layer having the first cladding layer on one side, wherein the core layer is tapered having a smaller thickness at the first end and a larger thickness at the second end; and a second cladding layer thinner than the first cladding layer, coated on another side of the core layer opposite to said one side of the core layer.

In some embodiments, the first cladding layer may also be tapered along the length of the PWG having a larger thickness at the first end and a smaller thickness at the second end with a taper angle substantially opposite that of the core layer to form the PWG with a substantially uniform overall thickness along the length. In some embodiments, the first cladding layer and the second cladding layer each may have a constant thickness along the length of the PWG to form the PWG with a varying overall thickness along the length with an overall taper angle substantially the same as a tapper angle of the core layer.

In some embodiments, the present invention is a PWG having a first end for coupling to a light pump and a second end opposite to the first end and including: an un-doped first cladding layer; and a uniformly doped core layer having the first cladding layer on one side, wherein the core layer is tapered having a smaller thickness at the first end and a larger thickness at the second end, and wherein the uniformly doped tapered core of the present invention is put in close contact with one or more thermal rejection coolers.

In some embodiments, the present invention is a method of fabricating an asymmetric planar wave guide (PWG) having a first end for coupling to a pump light source and a second end opposite to the first end. The method includes: generating a core blank, a cladding blank and end cap blanks from a laser host crystalline media (e.g., a refined yttrium aluminum garnet (YAG) powder); grinding and polishing the blanks, wherein the core blank is ground to a tapered shape having a smaller thickness at the first end and a larger thickness at the second end; bonding the tapered core blank to the cladding blank and the end cap blacks to obtain a PWG structure; finishing and optically polishing the PWG structure; and coating a side of the core blank opposite to the bonded cladding blank with an optical coating to form the asymmetric PWG.

BRIEF DESCRIPTION OF THE DRAWINGS

These and other features, aspects, and advantages of the present invention will become better understood with regard to the following description, appended claims, and accompanying drawings.

DETAILED DESCRIPTION

Figure 1:
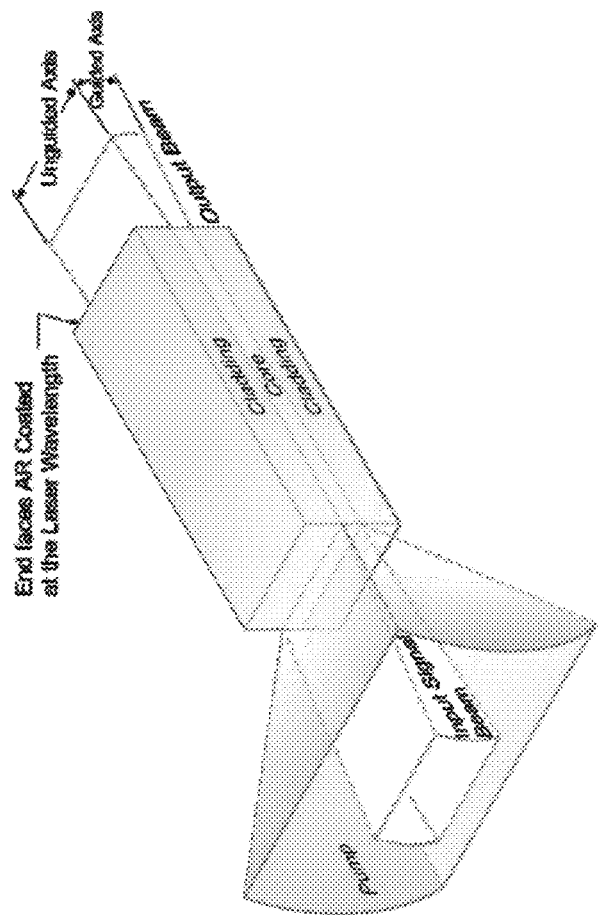
FIG. 1 shows a typical PWG geometry.

In some embodiments, the present invention is a PWG with an uniformly doped tapered core configuration. The core layer is uniformly doped across it thickness and width, resulting in a much more streamlined and less expensive fabrication of the PWG. In some embodiments, the PWG has a uniform overall thickness, in which tapering in the core is compensated by a reverse tapering of a (thick) cladding on one side. In some embodiments, the PWG has a (thick) cladding which is not tapered. In some embodiments, the cladding on one side of the core is much thinner than the cladding on the opposite side of the core leading to an asymmetry in physical structure, optical pumping configuration, and absorption of fluorescence resulting in heating asymmetries. In some embodiments, the present invention has a doped tapered core and only a single un-doped cladding layer.

In some embodiments, the pump absorption rate along the length of the PWG is varied due to the tapering of the core layer, resulting in lower absorption rate near pump input and increasing rate along the length. Increasing the absorption rate balances decreasing pump power to achieve a relatively uniform total absorbed power per unit length.

In some embodiments, the present invention is a PWG configured as a surrogate for the laser gain medium but with a non-lasing core that emulates an actual lasing PWG element in its pump light absorption and heat dissipation characteristics. Such a surrogate may be useful as a diagnostic tool in designing and testing a high power laser system, such as a laser weapon, without subjecting the components to high laser powers, thereby avoiding degradation or damage.

The present invention employs a cooling mechanism that is optimized differently on both sides of the PWG. This way, the present invention minimizes slow axis thermal gradients. Also, by reducing the absorption of fluorescence on the thin cladding side of the asymmetric PWG, the invention yields a substantial improvement in unguided axis wavefront error. In some embodiments, the doped tapered core of the present invention is put in intimate contact with thermal rejection coolers.

The PWG of the present invention may be used in an optical amplifier, a Mach-Zehnder interferometer, a wavelength division multiplexer, or high power lasers, such as a laser welding system or a laser weapon system.

In some embodiments, the present invention minimizes slow axis thermal gradients. In an embodiment, the absorption of fluorescence on the thinner cladding side of the asymmetric PWG is reduced by using a reflective coating at the signal wavelength thereby reducing the sensible heat that would be deposited in the core of the PWG which is in close thermal contact with this thin cladding. By minimizing this heat load, the invention yields a substantial improvement in unguided axis (otherwise known as the slow axis of the PWG) wavefront error. In some embodiments, the outer surface of the thick cladding side is made partially reflecting and partially absorbing, which helps to distribute the sensible heat load throughout the core region, further contributing to better temperature uniformity and lower wavefront error along the unguided axis.

With a tapered core region, relatively uniform pumping is achieved—the PWG of the present invention does not require any variable doping in the core to achieve pump absorption uniformity, thus making it easier to fabricate. Moreover, the thin PWG core of the present invention relative to the overall core/cladding thickness has a near constant pump beam numerical aperture (NA) along the length of the guide.

FIG. 1 shows a typical PWG geometry. As shown the input signal beam is introduced into the core layer at one end of the PWG (left side of the figure) and propagates in a guided mode through the core layer to the opposite end. The pump light from an array of laser diodes is introduced into one or both cladding layers and is confined within the PWG structure by coatings on the external surface of the cladding layers. The PWGs typically have a large surface area to volume ratio which enables efficient heat removal and low stress.

Figure 2:
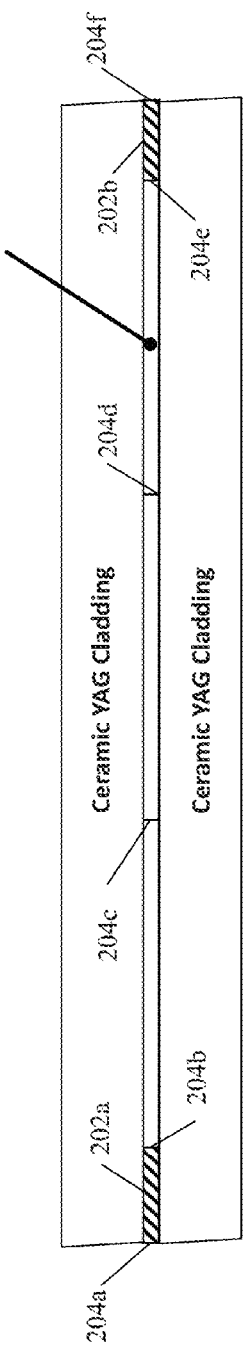
FIG. 2 shows a conventional three layer PWG.

FIG. 2 shows a conventional three layer PWG. As shown, a laser host crystalline media, for example, a yttrium aluminum garnet (YAG) core layer is sandwiched by two YAG claddings of the same thickness. This structure includes two large area bonds 202a and 202b to connect the core to the top and the bottom claddings, and a total of six bonds 204a-204f to bond the core, claddings and the end caps. The bonds may be achieved by diffusion bonding, by glass bonding, or other means known in the art. The YAG core may be a single crystal configuration, a ceramic composite, or multiple crystal or ceramic core sections. Typically, multiple core sections having different doping levels achieve balanced thermal loads, however, this is still not suitable for many applications. The manufacturing of this typical PWG has a long lead time due to complexity of multiple bonds.

The PWGs, shown in FIGS. 1 and 2 typically use a high aspect ratio active region to minimize the conduction path from the center of the active region to the cooled faces, thereby minimizing the temperature difference across the slab responsible for thermal lensing. Heat is constrained to flow predominantly in one direction perpendicular to the thin axis of the slab. Because the temperature is nearly uniform across the slow axis of the slab, thermal lensing in this direction is minimized. The temperature gradient also produces stress in the solid-state medium, which may further exacerbate the thermal lens, due to the opto-elastic effect, and cause thermal stress induced birefringence in the direction of the stress vector. For this reason, the laser beam polarization is normally oriented either parallel or perpendicular to the fast axis of the slab. The opposing broad surfaces of the PWG are actively cooled using means known in the art, for example, cold-plate modules may contact the surfaces directly or through an intermediary thermal optic interface (TOI) material, or with an intervening semi-static gaseous or liquid layer. Direct liquid cooling may use multi jet impingement or microchannel flow to enhance cooling efficiency and uniformity. A combination of cooling methods may also be used.

Figure 3:
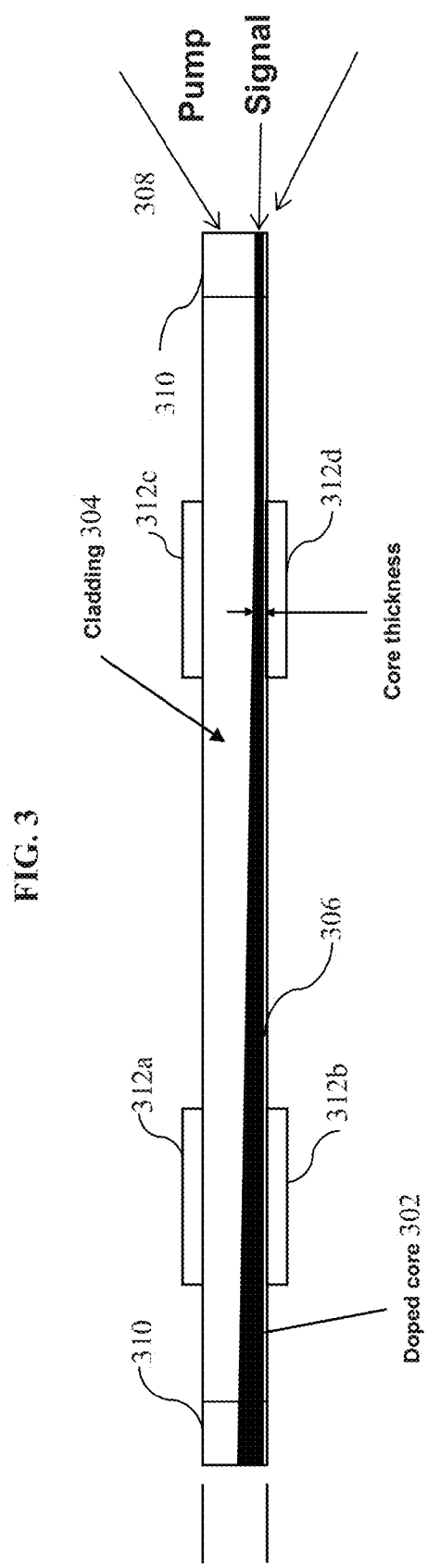
FIG. 3 shows an exemplary asymmetric PWG, according to some embodiments of the present invention.

FIG. 3 shows an exemplary asymmetric PWG, according to some embodiments of the present invention. As depicted, the core layer 302 has a uniform doping and a smaller thickness at the pump input end 308 and tapers to a larger thickness towards the other end of the guide with a taper angle substantially opposite that of the core layer. In these embodiments, if there are two cladding layers, one of the cladding layers, for example, the upper cladding layer 304 is substantially thicker than the other (lower, in this case) cladding layer 306. The lower cladding layer 306 (if any) is much thinner than the upper cladding layer 304 and may be merely a coating deposited on the core layer. In other words, the asymmetric PWG includes a first cladding layer (here, the top layer), a second cladding layer (here, the bottom layer), where the first cladding layer has a larger thickness than the second cladding layer. In some embodiments, the tapering of the thicker (upper) cladding 304 is opposite to the tapering of the core 302. That is, the thicker (upper) cladding 304 is tapered opposite to but with the same taper angle as that of the core 302, which has a smaller thickness at the pump input end 308 and tapers to a larger thickness towards the other end of the guide with an overall taper angle substantially the same as the taper angle of the core layer, to provide a substantially uniform overall thickness of the PWG device.

The core is tapered to allow for efficient thermal balancing. In some embodiments, the core is in intimate (close) contact with the (bottom) thermal cooler, because the bottom cladding is very thin, for example, a mere coating. That is, the majority of the sensible heat from the core (that due to quantum defect and absorption) is extracted from the thin cladding side and the heat removal on the other thick cladding side is tailored to improve overall temperature uniformity across the width (unguided dimension) of the PWG. In some embodiments, the absorption on thin side is minimized with a reflective outer coating and a small amount of absorption is added on thick side. This causes the fluorescence and ASE to bounce a limited number of times before it is fully absorbed thereby enhancing uniformity by smoothing out the thermal variations across the unguided dimension. If the thin bottom cladding is sufficiently thin it will not exhibit any significant thermal resistance and hence will be in "intimate" thermal contact with the cooler. In some embodiments, the thermal coolers 312a-312d are mounted, for example, bonded to the upper and lower broad faces of the PWG. Simulation results show that the PWG performance of these embodiments is improved by a factor of 2.

In an embodiment, the much thinner cladding on the bottom may be a mere coating on bottom of the core layer. Therefore, only one large area (i.e., the core to the thick cladding) needs to be bonded. That is, the asymmetric PWG includes a first cladding layer (here, the top layer), a second cladding layer (here, the bottom layer) and a uniformly doped tapered core layer. The first cladding layer having a larger thickness than the second cladding layer. The asymmetric PWG in this embodiment may require a total of only three bonds to bond the core, the thicker cladding and the end caps 310. The lack of, or the mere coating of a second cladding eliminates many bonding processes and therefore further simplifies the manufacturing process and shortens the lead time.

In the present invention, the pump light is confined between the external surfaces of the cladding layers thereby intersecting and being partially absorbed on each pass. The much thinner core region is tapered so that the increased absorption in the core offsets the loss of pump light intensity. This achieves more uniform pumping along the length of the laser gain medium resulting in a more uniform temperature profile and lower stress, thereby producing better output beam wavefront quality and less depolarization. Also, the laser beam is confined to propagate in a low order mode.

In some embodiments, the present invention is a laser that includes the exemplary embodiments of the asymmetric PWG. High signal intensity enables high efficiency and high gain, and high aspect ratio enables simple, efficient pump coupling from, for example, affordable COTS laser diode arrays. Short length and large core area enable narrow-band operation at high output powers without deleterious nonlinear effects, such as stimulated Brillouin scattering. Design simplicity enables compact packaging with low size and weight. Other optical components, such as Mach-Zehnder interferometers, wavelength division multiplexers, and laser diodes can use the asymmetric PWG of the present invention.

Figure 4:
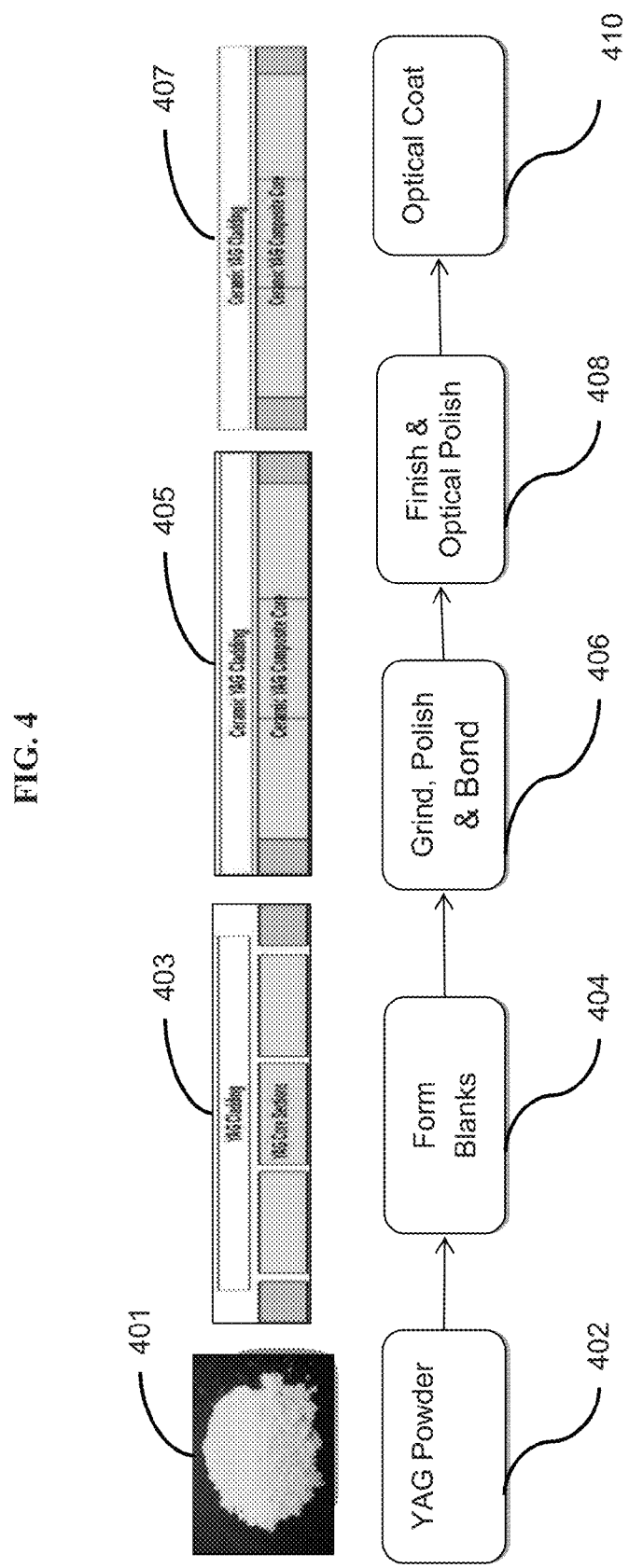
FIG. 4 illustrates an exemplary process for manufacturing of the asymmetric PWG, according to some embodiments of the present invention.

FIG. 4 illustrates an exemplary process for manufacturing of a ceramic asymmetric PWG, according to some embodiments of the present invention. As shown, a laser host crystalline media 401, for example, a YAG powder 401 is refined and purified and a precise stoichiometry is obtained, in block 402. One skilled in the art would realize that an already refined and purified laser host crystalline media (e.g., YAG powder) may be obtained instead. In block 404, blanks (un-bonded PWG components) are generated from the YAG, for example by sintering the laser host crystalline media and compacting it into a certain starting shape using a hot isostatic pressing (HIP) process. As a result, the blanks that are to become core, cladding and end-cap components of the PWG 403 are obtained. In some embodiments, the core blank comprises of multiple blank segments that would be bonded together to form a single segment core blank. In some embodiments, the core blank comprises of a single blank segment that does not any bonding to form the core blank, resulting in yet a simpler process.

The blanks are then ground and polished to a near-final shape and bonded together to produce a monolithic PWG structure, as shown in block 406. In some embodiments, the core blank is ground to a tapered shape having a smaller thickness at the first end and a larger thickness at the second end and then the tapered core blank is bonded to the cladding blank and the end cap blacks to obtain a PWG structure. In some embodiments, the core blank is polished and bonded to the cladding blank (and optionally, to the end cap blacks) to form a bonded structure, which is more stable. The core blank in the bonded structure is then ground to a tapered shape having a smaller thickness at the first end and a larger thickness at the second end to obtain a PWG structure.

In some embodiments, diffusion bonding is used to bond the core, claddings and the end caps. The bonded PWG structure 405 is then ground to final shape, finished and optically polished again (block 408) to obtain the asymmetric PWGs of the present disclosure.

In block 410, one or more optical coatings may be applied. In some embodiments, evanescent wave coating may be applied to the core (if exposed on one surface) or the cladding region(s) or both. The e-wave coating confines the evanescent wave that exists on the low index side of a TIR surface within an optical medium such that the numerical aperture of the waveguide and phase shift properties can be controlled. The e-wave coating also ensures low reflectivity for amplified spontaneous emission, where desired, and provides a barrier between the core layer and the cooling elements, especially in the case where direct liquid cooling is used, and protection from contamination and wear.

Thus, a method of fabricating an asymmetric PWG includes: generating a core blank, a cladding blank and end cap blanks from a refined yttrium aluminum garnet (YAG) powder; polishing the blanks; bonding the tapered core blank to the cladding blank and the end cap blacks; grinding the bonded core blank to a tapered shape having a smaller thickness at the first end and a larger thickness at the second end to obtain a PWG structure; finishing and optically polishing the PWG structure; and coating a side of the core blank opposite to the bonded cladding blank with an optical coating to form the asymmetric PWG. As described above, the core blank may be bonded to the cladding blank (and optionally, to the end cap blacks) first and then ground to a tapered shape.

In some embodiments, one side of the core layer on the asymmetric tapered guide is coated with a uniform layer of material that serves as an evanescent wave (e-wave) coating. The coating layer is typically a few microns thick. In these embodiments, only the (thick) cladding on the other side of the core is used, resulting in fewer bonded components and fewer number of bonds in the overall PWG structure, thereby simplifying the PWG fabrication process. The tapered-core PWG of the present invention does not require any variable doping in the core or multiple core segments with different doping concentrations to achieve pump absorption uniformity, thus making it easier to fabricate.

It will be recognized by those skilled in the art that various modifications may be made to the illustrated and other embodiments of the invention described above, without departing from the broad inventive step thereof. It will be understood therefore that the invention is not limited to the particular embodiments or arrangements disclosed, but is rather intended to cover any changes, adaptations or modifications which are within the scope of the invention as defined by the appended claims.

What is claimed is:

1. A planar wave guide (PWG) having a first end for coupling to a pump light source and a second end opposite to the first end comprising:
    an un-doped first cladding layer;
    a uniformly doped core layer having the first cladding layer on one side, wherein the core layer is tapered having a smaller thickness at the first end and a larger thickness at the second end, and wherein the uniformly doped tapered core is put in contact with one or more thermal rejection coolers; and
    a second cladding layer thinner than the first cladding layer, coated on another side of the core layer opposite to said one side of the core layer, wherein the first cladding layer is tapered along the length of the PWG and having a larger thickness at the first end and a smaller thickness at the second end with a taper angle substantially opposite the core layer to form the PWG with a substantially uniform overall thickness along the length.

2. The PWG of claim 1, wherein the second cladding layer is coated with a uniform layer of material that serves as an evanescent wave (e-wave) coating.

3. An optical amplifier including the PWG of claim 1.

4. A Mach-Zehnder interferometer including the PWG of claim 1.

5. A wavelength division multiplexer including the PWG of claim 1.

6. A high power laser system including the PWG of claim 1.

7. A laser diode including the PWG of claim 1.

8. A planar wave guide (PWG) having a first end for coupling to a pump light source and a second end opposite to the first end comprising:
    an un-doped first cladding layer;
    a uniformly doped core layer having the first cladding layer on one side, wherein the core layer is tapered having a smaller thickness at the first end and a larger thickness at the second end, and wherein the uniformly doped tapered core is put in contact with one or more thermal rejection coolers; and
    a second cladding layer thinner than the first cladding layer, coated on another side of the core layer opposite to said one side of the core layer, wherein the first cladding layer and the second cladding layer each have a constant thickness along the length of the PWG to form the PWG with a varying overall thickness along the length with an overall taper angle substantially the same as the core layer.

9. The PWG of claim 8, wherein the second cladding layer is coated with a uniform layer of material that serves as an evanescent wave (e-wave) coating.

10. An optical amplifier including the PWG of claim 8.

11. A Mach-Zehnder interferometer including the PWG of claim 8.

12. A wavelength division multiplexer including the PWG of claim 8.

13. A high power laser system including the PWG of claim 8.

14. A laser diode including the PWG of claim 8.

* * * * *